US012363737B2

(12) United States Patent
Marinier et al.

(10) Patent No.: US 12,363,737 B2
(45) Date of Patent: Jul. 15, 2025

(54) IMPROVING COVERAGE IN A HIGH FREQUENCY RANGE

(71) Applicant: InterDigital Patent Holdings, Inc., Wilmington, DE (US)

(72) Inventors: Paul Marinier, Brossard (CA); Aata El Hamss, Laval (CA); Moon-il Lee, Melville, NY (US); Loic Canonne-Velasquez, Dorval (CA); Tuong Duc Hoang, Montreal (CA); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 456 days.

(21) Appl. No.: 17/918,381

(22) PCT Filed: Apr. 12, 2021

(86) PCT No.: PCT/US2021/026826
§ 371 (c)(1),
(2) Date: Oct. 12, 2022

(87) PCT Pub. No.: WO2021/211425
PCT Pub. Date: Oct. 21, 2021

(65) Prior Publication Data
US 2023/0148282 A1 May 11, 2023

Related U.S. Application Data

(60) Provisional application No. 63/009,500, filed on Apr. 14, 2020.

(51) Int. Cl.
*H04W 72/0446* (2023.01)
*H04B 7/02* (2018.01)
(Continued)

(52) U.S. Cl.
CPC ........ *H04W 72/0446* (2013.01); *H04B 7/028* (2013.01); *H04L 5/0035* (2013.01); *H04W 72/046* (2013.01); *H04W 72/232* (2023.01)

(58) Field of Classification Search
CPC ............ H04W 72/0446; H04W 72/232; H04B 7/028
See application file for complete search history.

(56) References Cited

U.S. PATENT DOCUMENTS 11,991,693 B2 * 5/2024 Gao .................. H04W 72/0466
2019/0103908 A1 4/2019 Yu et al.
(Continued)

FOREIGN PATENT DOCUMENTS

| TW | 201924242 A | 6/2019 |
|---|---|---|
| WO | 2018174667 A1 | 9/2018 |
| WO | WO 2018-232199 A1 | 12/2018 |
| WO | WO 2019-099659 A1 | 5/2019 |

OTHER PUBLICATIONS

3rd Generation Partnership Project (3GPP), R1-1700538, "Beam Management and subcell", Panasonic, 3GPP TSG RAN WG1 NR adhoc, Spokane, USA, Jan. 16-20, 2017, 4 pages.
(Continued)

*Primary Examiner* — Joseph E Avellino
*Assistant Examiner* — Maryam Emadi
(74) *Attorney, Agent, or Firm* — Condo Roccia Koptiw LLP

(57) ABSTRACT

A wireless transmit receive unit (WTRU) may be configured to receive configuration information from a network regarding a set of spatial filters for the WTRU to use to communicate with the network. Each of the spatial filters may be associated a beam group and/or a measurement resource. The WTRU may further receive downlink control information (DCI) that indicates one or more time periods in which a portion of the set of configured spatial filters may be applicable. Based on the configuration information, the DCI,
(Continued)

and/or a measurement, the WTRU may select a spatial filter from the portion of spatial filters to apply in the time period, and the WTRU may perform a communication task in the time period using the selected spatial filter.

20 Claims, 8 Drawing Sheets

(51) Int. Cl.
*H04L 5/00* (2006.01)
*H04W 72/044* (2023.01)
*H04W 72/232* (2023.01)

(56) References Cited

U.S. PATENT DOCUMENTS

| | | | |
|---|---|---|---|
| 2020/0052844 A1* | 2/2020 | Yu | H04L 5/0051 |
| 2020/0059286 A1 | 2/2020 | Xiong et al. | |
| 2023/0362968 A1* | 11/2023 | Xi | H04W 72/53 |
| 2024/0422791 A1* | 12/2024 | Iyer | H04L 5/0078 |

OTHER PUBLICATIONS

3rd Generation Partnership Project (3GPP), RP-193240, "New SIDS on NR coverage enhancement", China Telecom, 3GPP TSG RAN Meeting #86, Sitges, Spain, Dec. 9-12, 2019, 4 pages.

\* cited by examiner

US 12,363,737 B2

IMPROVING COVERAGE IN A HIGH FREQUENCY RANGE

CROSS-REFERENCE TO RELATED APPLICATIONS

This application is the National Stage Entry under 35 U.S.C. § 371 of Patent Cooperation Treaty Application No. PCT/US2021/026826, filed Apr. 12, 2021, which claims the benefit of Provisional U.S. Patent Application No. 63/009,500, filed Apr. 14, 2020, the disclosure of which is incorporated herein by reference in its entirety.

BACKGROUND

Mobile communications using wireless communication continue to evolve. A fifth generation may be referred to as 5G or new radio (NR). Previous (legacy) generations of mobile communication may include, for example, fourth generation (4G) long term evolution (LTE). A 5G/NR communication system may support a high frequency range and/or high data rate. In high frequencies, a communication channel may be subject to high phase noise, large propagation loss, and/or low power amplifier efficiency, which may impact the coverage of a network. Thus, techniques for enhancing the coverage of a network without increasing deployment costs may be desirable.

SUMMARY

Systems, methods, and instrumentalities are described herein for improving the coverage of a network, e.g., in a high frequency range. A wireless transmit receive unit (WTRU) implemented in accordance with the embodiments described herein may comprise a processor that configured to receive configuration information from a network regarding a set of spatial filters for the WTRU to use to communicate with the network. Each of the spatial filters may be associated a beam group or a spatial filter group (e.g., linked or mapped to a beam group index or spatial filter group index) and/or a measurement resource such as a reference signal. The WTRU may (e.g., subsequent to receiving the spatial filter configuration information) receive downlink control information (DCI), where the DCI may indicate at least one time period (e.g., a set of time periods) in which a portion of the set of configured spatial filters may be applicable. Based on at least the configuration information and the DCI, the WTRU may select a spatial filter from the portion of spatial filters to apply in the at least one time period, and the WTRU may perform a communication task in the at least one time period using the selected spatial filter.

In examples, the WTRU may be configured to determine that multiple spatial filters (e.g., belonging to one or multiple beam groups or spatial filter groups) are applicable in the at least one time period, and may select the spatial filter to apply in the at least one time period further based on a measurement performed on the measurement resource associated with the spatial filter. For instance, the WTRU may select the spatial filter based on a result of the measurement being above or below a threshold.

The time periods described herein may include a set of slots, subframes, and/or symbols, and the DCI received by the WTRU may indicate that the portion of the set of spatial filters is applicable in multiple such time periods and/or that the DCI is common to a group of WTRUs. In examples, such DCI may comprise one or more beam group indices that identify corresponding beam groups applicable in the timer periods and the WTRU may determine the portion of the set of spatial filters applicable in the time period based on an association between the beam group indices and spatial filters (e.g., the association may be indicated in the configuration information received from the network).

In examples, the WTRU may be further configured to determine, based on the spatial filter selected for the time period, a frequency resource to use to perform the communication task (e.g., transmission of an uplink transmission or reception of a downlink transmission). In examples, the WTRU may be configured to communicate with multiple transmission/reception points (TRPs) and the communication task performed using the spatial filter may be associated with one of the multiple TRPs. In examples, the WTRU may be further configured to transmit uplink control information (UCI) or a media access control (MAC) control element (MAC CE) to the network to indicate a plurality of spatial filters autonomously selected by the WTRU.

EXAMPLE NETWORKS FOR IMPLEMENTATION OF THE EMBODIMENTS

Figure 1A:
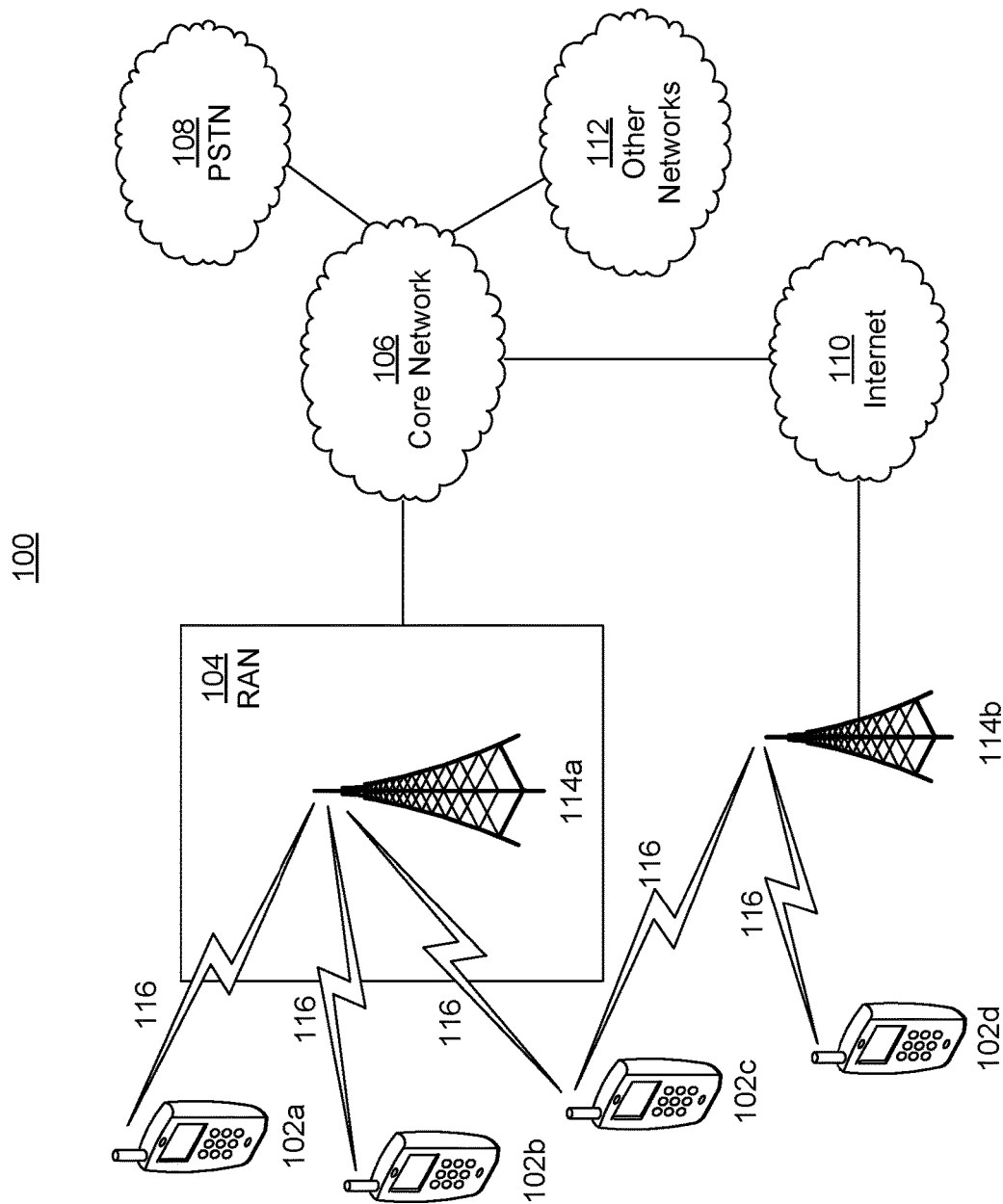
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
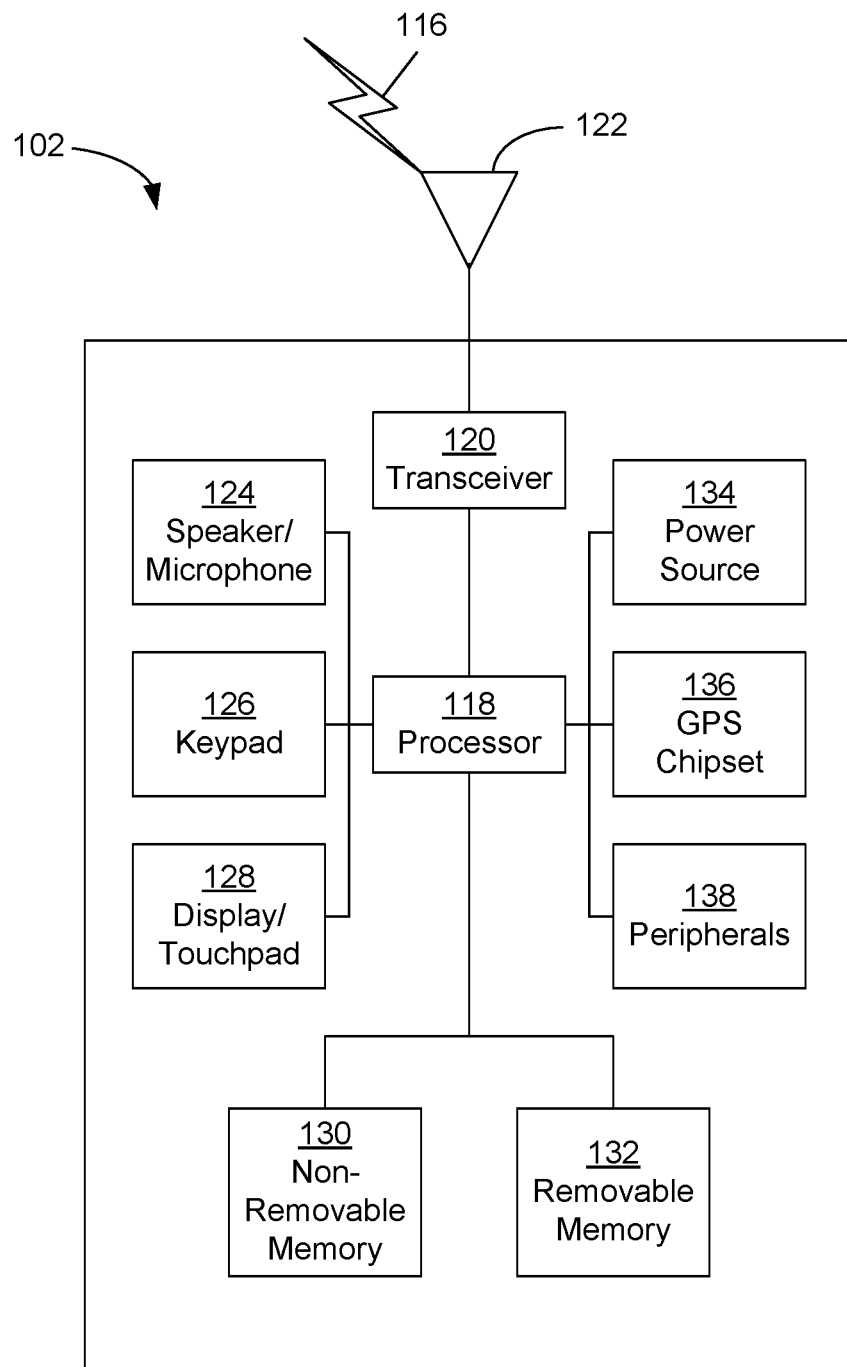
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
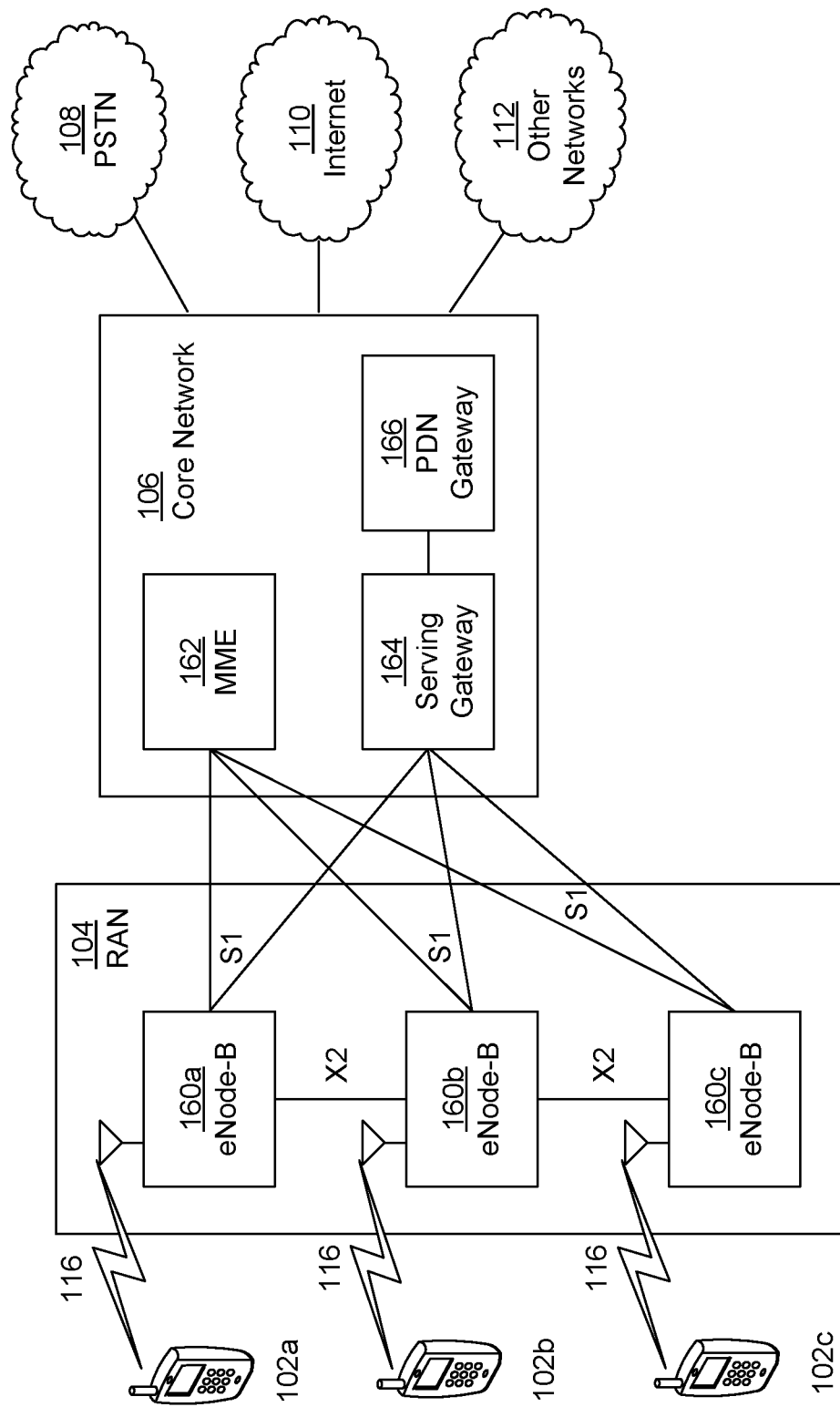
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
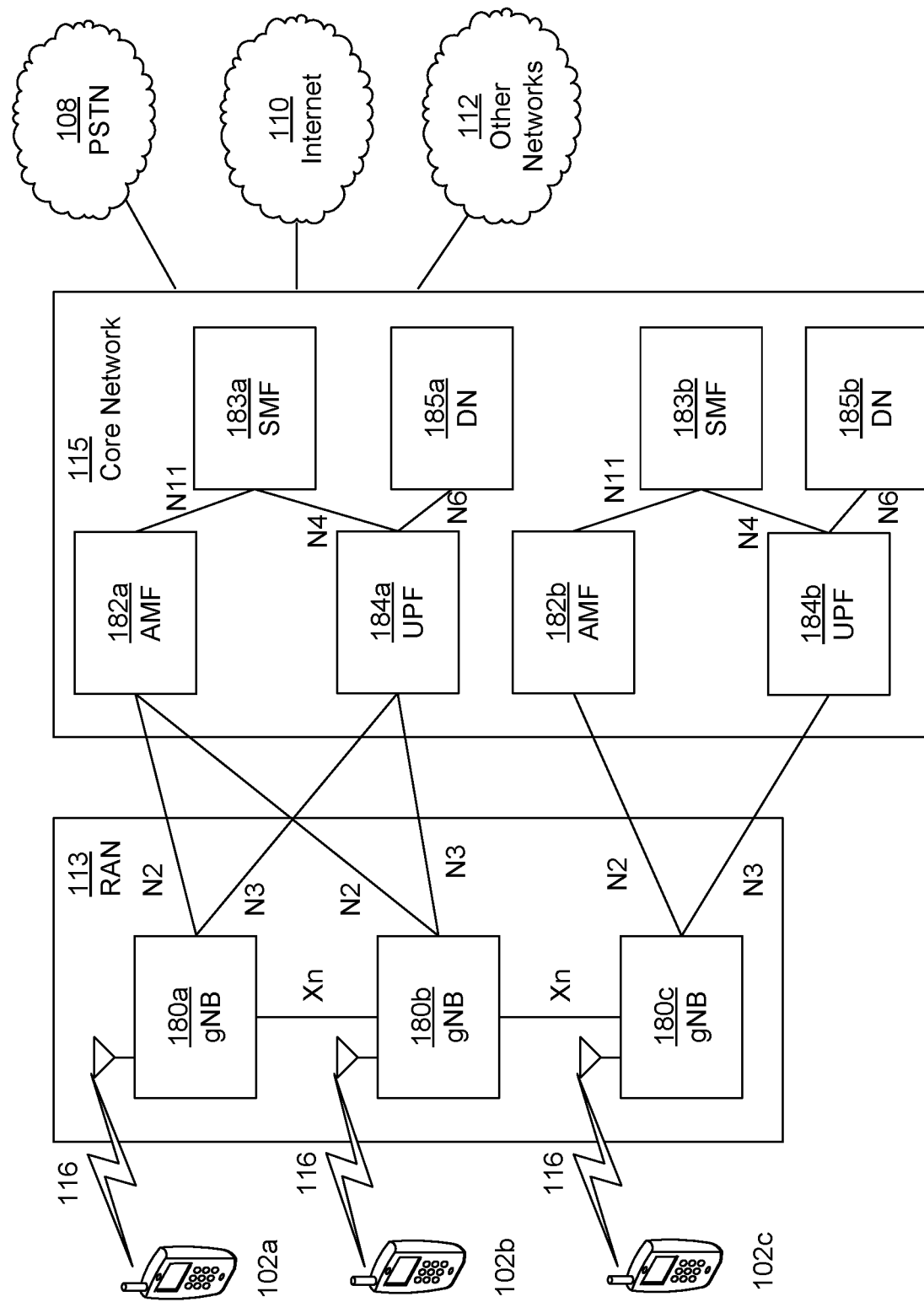
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

New generations of radio technologies such as NR may support high frequencies, such as frequency range two (FR2), for example, to offer high data rate communication. A channel operating in high frequencies may be subject to high phase noise, large propagation loss, and/or low power amplifier efficiency. High frequency channel characteristics may impact cell coverage and quality of service. Coverage of a network may be enhanced, for example, by adding more cells or base stations (e.g., gNBs) to the cellular infrastructure, but doing so may increase deployment costs. Enhancing coverage without adding more cells may avoid cost increases for operators to deploy cellular infrastructure. Coverage enhancements may be applied for frequency range one (FR1) and frequency range two (FR2). In examples, enhancements may be provided in urban and rural scenarios (e.g., for FR1) and/or in indoor and urban/suburban scenarios (e.g., for FR2). Enhancements may be applied to enhanced massive mobile broadband (eMBB) service and voice over Internet Protocol (VoIP) service. Performance (e.g., coverage) enhancements may be applied for downlink (DL) and uplink (UL).

Configured grants and assignments may support transmission of a physical uplink shared channel (PUSCH) and/or reception of a physical downlink shared channel (PDSCH), for example, without requiring reception of downlink control information (DCI), e.g., in one or more instances. A spatial filter (e.g., to use for PUSCH and PDSCH resources) may be determined, for example, semi-statically and/or by an activation DCI. When referred to herein, a spatial filter may generally include functions or operations that are performed by a communication device (e.g., via software and/or hardware components) to form a specific beam and transmit/receive data through the beam. For example, by applying a spatial filter, a communication device such as a WTRU described herein may set or adjust the phase and/or amplitude of a transmission or reception performed using an antenna. The term "spatial filter" may be used interchangeably herein with "spatial domain filter," "beam forming function," "beam forming operation," or "beamforming filter."

Operation in a high frequency range (e.g., FR2) may involve use of narrow beams at WTRUs and/or network transmission/reception points (TRPs), for example, to compensate for high path loss. A TRP may be limited in the number of beams that it can use at a given time. A TRP may serve multiple WTRUs that are spatially separated, which may imply that an effective fraction of time available for communication between a WTRU and a TRP may be restricted. Enabling communication with more than one TRP may increase the fraction of time available for a WTRU and (e.g., therefore) increase the coverage range of a network. A WTRU may (e.g., dynamically) change a beam (e.g., on a slot or symbol basis), for example, to adapt to one or more TRPs that can serve the WTRU at a given time (e.g., as shown by the example in FIG. 2).

Figure 2:
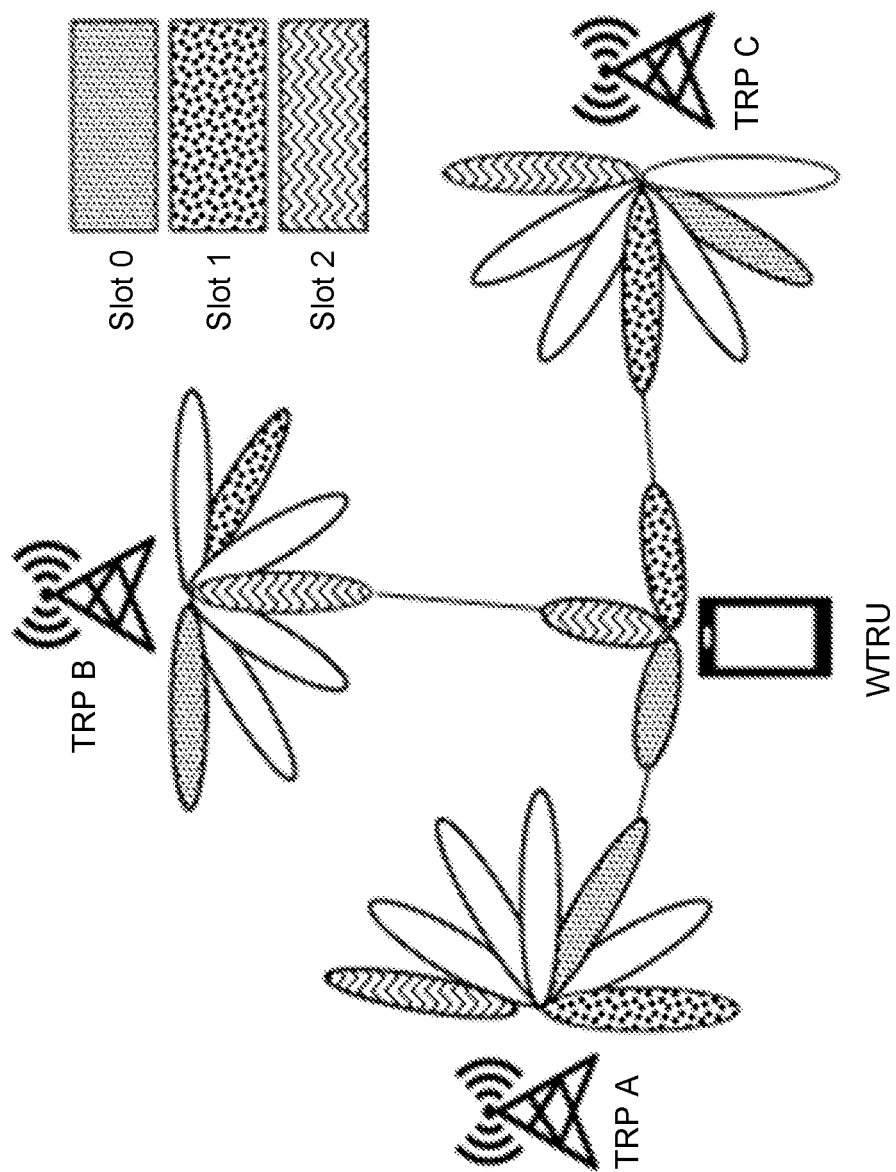
FIG. 2 is a diagram illustrating an example of a time limitation associated with performing a multi-beam transmission using one transmission/reception point (TRP).

FIG. 2 is a diagram illustrating an example of a time limitation of multi-beam transmission using one TRP. In the example, a WTRU may be constrained to be served (e.g., only) by TRP A. Transmission may occur (e.g., only) during Slot 0, for example, if TRP A is not using the appropriate beam during Slot 1 and Slot 2 (e.g., when the beams of TRP A may be formed to serve other WTRUs). Enabling dynamic beam change may allow (e.g., support) the WTRU to communicate with other TRPs such as TRP B and TRP C during Slot 1 and Slot 2.

Dynamic control of a beams (e.g., WTRU beams) may be implemented, for example, with low control overhead. Dynamic control of beams (e.g., WTRU beams) may be implemented, for example, for a PUSCH scheduled by a configured grant. A beam indication (e.g., a sounding reference signal (SRS) resource indicator or index (SRI)) may be configured, for example, semi-statically (e.g., type 1) or may be included in an activation command (e.g., type 2). Dynamic adaptation of beams may be supported (e.g., implemented) for a PUSCH such as a dynamically scheduled PUSCH. For at least some traffic types (e.g., voice), the control signaling associated with such dynamic adaption may be relatively high.

Dynamic control or adaptation of beams (e.g., WTRU beams) may be supported (e.g., implemented) for a physical uplink control channel (PUCCH). A beam indication may be configured (e.g., semi-statically) for a (e.g., each) PUCCH resource (e.g., via an information element (IE) such as spatialRelationInfo). A beam may not be dynamically adapted, for example, if a PUCCH resource is not associated with a recent DCI (e.g., DCI associated with a scheduling request, periodic or semi-persistent channel state information (CSI), or a hybrid automatic repeat request acknowledgment (HARQ-ACK) for a semi-persistent PDSCH).

Dynamic control or adaptation of beams (e.g., WTRU beams) may be supported (e.g., implemented) for a PDSCH (e.g., a semi-persistently scheduled PDSCH). A transmission configuration indicator (TCI) state may be indicated in a semi-persistent scheduling (SPS) activation message or command. A TCI may be changed for recurring assignments, for example, if a reactivation message or command is received, which may not allow beam adaptation (e.g., on a slot basis). Dynamic control of beams (e.g., WTRU beams) may be supported (e.g., implemented) for a PDCCH. A TCI state may be indicated, for example, by a medium access control (MAC) CE, which may not allow for dynamic changes of a beam (e.g., on a slot basis).

Network coverage may be improved (e.g., in a high frequency range), for example, with low-overhead control of beams (e.g., WTRU beams). Such control of the beams may be based on (e.g., using) one or more of the following principles, for example. A candidate set of spatial filters (e.g., corresponding to respective beams) may be configured for at least one resource (e.g., a time and/or frequency resource). A beam group index for a (e.g., each) spatial filter may be configured. A WTRU may be configured to receive control signaling indicating whether one or more beam groups are allowed in a set of time periods or time intervals (e.g., a set of frames, subframes, slots, and/or symbols). A WTRU may be configured to select a spatial filter in a (e.g., each) time interval from a set of spatial filters based on whether the one or more beam groups are allowed for the time interval. A WTRU may receive configuration information regarding a measurement resource (e.g., a reference signal) associated with a (e.g., each) spatial filter. A WTRU may be configured to select a spatial filter in a (e.g., each) time interval based on a condition that the spatial filter may maximize a measurement result of a corresponding measurement resource. The term "beam group" may be used interchangeably herein with the term "spatial filter group," and the term "beam group index" may be used interchangeably herein with the term "spatial filter group index."

In examples, a resource may be associated with a PUSCH transmission, for example, using a configured grant or a PDSCH transmission received based on an SPS assignment. A candidate set of spatial filters may include multiple (e.g., two) spatial filters. A (e.g., each) spatial filter may be defined, for example, by a spatial relation to a CSI-reference signal (CSI-RS) or a synchronization signal block (SSB). A (e.g., each) CSI-RS or SSB may be associated with a beam group index. A CSI-RS or SSB may be transmitted, for example, from two spatially separated TRPs, e.g., from a network perspective. Low overhead control signaling may be realized, for example, via group-common DCI that may be encoded, for example, according to a DCI format containing one or more fields indicating whether a beam associated with a beam group index may be used for at least one time interval. In examples, a DCI format may include a bitmap, in which a (e.g., each) bit may indicate whether a beam group index is allowed (e.g., or not allowed) for a time period or time interval (e.g., a subframe, a slot, a time symbol, etc.). For instance, the DCI format may indicate, via the bitmap, that one or more beam groups are allowed (e.g., or not allowed) for a time period or time interval.

Beams (e.g., WTRU beams) may be dynamically controlled with reduced (e.g., small or minimized) overhead (e.g., from a network perspective). The low overhead may be attributable to, for example, the use the one set of control signaling for multiple WTRUs, by which resources (e.g., beam usage at each TRP) may be reallocated for multiple time periods or intervals (e.g., slots) and/or for multiple WTRUs without requiring control signaling for each individual WTRU and/or each time period or time interval.

A WTRU may be configured to receive a grant and/or an assignment (e.g., with multiple properties) for a transmission or reception. The grant or assignment may include, for example, at least one of the following properties: a frequency allocation; an aspect of a time allocation (e.g., a transmission duration); a transmission priority; a modulation and coding scheme (MCS) associated with a transmission or reception; a transport block (TB) size; a number of spatial layers (e.g., including respective properties of the spatial layers); a number of transport blocks; a TCI state; a CRI; an SRI; a number of repetitions associated with a transmission or reception; an indication of a type of repetition scheme (e.g., Type A or Type B); an indication of a grant type (e.g., a configured grant type 1, a configured grant type 2, or a dynamic grant); an indication of a type of assignment (e.g., a dynamic assignment or a semi-persistent scheduling assignment including a configured assignment); a configured grant index or a semi-persistent assignment index; a periodicity of a configured grant or assignment; a channel access priority class (CAPC); or a parameter provided in a DCI, via a MAC or via radio resource control (RRC) signaling for the scheduling of a grant or assignment.

When described herein, a property of data included in a transport block (TB) may refer, for example, to a (e.g., any) parameter configuring a logical channel or radio bearer for which data may be included in the TB. Such a property may include, e.g., a logical channel priority, a prioritized bit rate, a logical channel group, and/or a radio link control (RLC) mode). A property of a grant or assignment may refer to a property of the data included in a corresponding TB.

An indication may be provided via DCI and/or received by a WTRU. Such an indication may include, for example, at least one of an (e.g., explicit) indication by a DCI field or by a radio network temporary identifier (RNTI) that may be used to mask a cyclic redundancy check (CRC) of a PDCCH, or an (e.g., implicit) indication that be inferred based on a property, such as, for example, a DCI format, a DCI size, a control resource set (CORESET) or search space, an aggregation level, and/or a first resource element of a received DCI (e.g., index of first control channel element). A mapping between such properties and indication values may be signaled, for example, via RRC signaling or via a MAC.

An indication may be provided about a beam. A WTRU may transmit or receive a physical channel or reference signal, for example, according to at least one spatial domain filter, which may also be referred to herein as a spatial filter or a beam. A WTRU may transmit a physical channel or signal, for example, using a spatial domain filter that may also be used to receive an RS (e.g., CSI-RS) or a synchronization signal (SS) block. A WTRU transmission may be referred to as a "target." An RS or SS block received by a WTRU may be referred to as a "reference" or a "source." A WTRU may transmit a target physical channel or signal, for example, according to a spatial relation with a reference signal such as an RS or SS block.

A WTRU may transmit a first physical channel or signal, for example, according to a spatial domain filter that may be used by the WTRU to transmit a second physical channel or signal. The first and second transmissions may be referred to as a "target" and a "reference" or "source", respectively. A WTRU may transmit a first (e.g., target) physical channel or signal, for example, according to a spatial relation with a second (e.g., reference) physical channel or signal. Such a spatial relation may be, for example, implicitly determined, configured by an RRC, or signaled via a MAC CE or DCI. In examples, a WTRU may (e.g., implicitly) transmit a PUSCH transmission and a DM-RS associated with the PUSCH, for example, according to the same spatial domain filter used by an SRS. Such a spatial domain filter may be derived, for example, based on a SRI indicated in DCI or configured via RRC signaling. In an example, the spatial relation described herein may be configured (e.g., by RRC for an SRI), or may be signaled (e.g., by a MAC CE, for a PUCCH transmission, for example). In one or more examples provided herein, such a spatial relation may be referred to as a "beam indication."

A spatial relation may be configured with one or more parameters such as, e.g., a resource that may be used as a pathloss reference, at least one power offset (P0), and/or an index to a closed loop adjustment. These parameters may be applicable, for example, to setting the transmission power for a physical channel or signal (e.g., if the physical channel or signal is transmitted according to the spatial relation).

A WTRU may receive a first (e.g., target) downlink channel or signal according to a spatial domain filter or a spatial reception parameter used for a second (e.g., reference) downlink channel or signal. An association may exist between a physical channel (e.g., PDCCH or PDSCH) and the DM-RS's associated with the physical channel. In examples (e.g., if the first and second signals described herein are reference signals), such an association may exist if the WTRU is configured with a quasi-colocation (QCL) assumption type D between corresponding antenna ports. The association may be configured, for example, as a TCI state. A WTRU may receive an indication of an association between a CSI-RS (or an SS block) and a DM-RS, for example, via an index to a set of TCI states configured by RRC and/or signaled through a MAC CE. In at least some examples provided herein, such an indication may be referred to as a beam indication.

A WTRU may be configured to apply at least one spatial filter out of a configured set of spatial filters for transmission or reception of information using a resource (e.g., a PUSCH, PUCCH, PDCCH, PDSCH or physical random access channel (PRACH)). The configured set of spatial filters may be referred to as a candidate beam set.

A WTRU may select or determine a spatial filter out of a configured set of spatial filters (e.g., a candidate beam set) for transmission or reception of information. A WTRU may select a spatial filter out of a configured set of spatial filters (e.g., a candidate beam set) for a time period (e.g., a given time symbol). A (e.g., each) spatial filter of a configured set of spatial filters may be identified by a beam indication, for example, as described herein. For example, a (e.g., each) spatial filter may be identified by a spatial relation to a resource identified by an SRI, a CRI, an SSB index, an SSB index of a non-serving cell characterized by at least a physical cell identity, a TCI state, and/or an index to spatial relation information. The resource may be used as a reference for determining a spatial relation or a QCL association (e.g., a TCI state).

A (e.g., each) spatial filter or beam indication that may be configured as part of a candidate beam set may be identified with an index within the candidate beam set. Such an index may be referred to herein as a beam candidate index. A (e.g., each) spatial filter or beam indication that may be configured as part of a candidate beam set may be associated with an identity of a beam group, which may be referred to as a beam group index. Selection of a spatial filter out of a candidate beam set for transmission or reception of information may be performed based on (e.g., as a function of) whether a beam group index associated with the spatial filter is allowed for the transmission or reception.

A WTRU may be configured with one or more candidate beam sets. Configuration information for each of the candidate beam sets may include, for example, one or more of the following: an identifier of the candidate beam set, a set of beam indications, and/or a beam group index associated with each of the beam indications, if applicable.

A WTRU may be configured to select (e.g., determine) a candidate beam set and/or determine the applicability of the selected beam set. In examples, the WTRU may determine a candidate beam set based on at least one of RRC signaling, a MAC CE, or physical layer signaling. The WTRU may also determine the applicability of the candidate beam set, as illustrated below.

The WTRU may determine the applicability of a candidate beam set for a type of resources, uplink control information (UCI), data, assignments, and/or grants. For example, the WTRU may determine that a candidate beam set is applicable (e.g., only) to at least one of a PUSCH scheduled by configured grant type 1 and/or type 2, a PDSCH scheduled by an SPS assignment, a (e.g., periodic or semi-persistent) CSI report on a PUCCH or PUSCH, a scheduling request or link recovery request, or a PDCCH.

The WTRU may determine the applicability of a candidate beam set for an instance of a resource, which may include one or more (e.g., all or a subset of) repetitions of a physical channel, if applicable. For example, the WTRU may determine that a candidate beam set is applicable to one or more (e.g., all) repetitions of a PUSCH or PDSCH that may be scheduled, e.g., by a dynamic grant or assignment. The candidate beam set may be indicated, for example, by a field of DCI that may include a grant or assignment, or by an RNTI that may be used to scramble a DCI. The candidate beam set may be identified by (e.g., as a function of) a repetition index of a PUSCH or PDSCH (e.g., according to a configured pattern). For example, a candidate beam for a given repetition may include (e.g., be associated with) a single spatial filter. Such a spatial filter may be identified by (e.g., as a function of) at least one of a repetition index, a grant or assignment property, and/or a slot and/or symbol (e.g., according to a configured pattern).

A WTRU may determine the applicability of a candidate beam set for one or more instances of a resource. In examples, the WTRU may determine that a candidate beam set is applicable to one or more (e.g., all) instances of a PUSCH or PDSCH that may be scheduled, for example, by a configured grant or a semi-persistent scheduling (SPS) assignment. The candidate beam set may be configured as a part of the configured grant or SPS configuration. The candidate beam set may be configured via a field in DCI, which may contain a command to activate or reactivate the candidate beam set. In examples, the WTRU may determine, based on a configuration by RRC or based on a MAC CE, that a candidate beam set is applicable to one or more (e.g., all) instances of a PDCCH for a certain CORESET or search space.

A WTRU may determine the applicability of a candidate beam set for a time period or time interval such as a symbol, a slot, a subframe, and/or a frame. The time interval may be implemented (e.g., determined) with reference to a common (e.g., cell wide) timing framework (e.g., a frame boundary) or with reference to the start or end of a transmission (e.g., the Nth symbol or Mth repetition of a PUSCH transmission). In examples, first and second candidate beam sets may be respectively applicable to first and second sets of time intervals (e.g., symbols, slots, subframes, and/or frames). A (e.g., each) set of time intervals may correspond to a repetition in time of a pattern, and may be configured as a bitmap or using a formula. The pattern may be configured by RRC, a MAC CE, DCI (e.g., group-common DCI), etc.

A WTRU may determine the applicability of a candidate beam set for a bandwidth part and/or for a set of resource blocks within a bandwidth part. The set of resource blocks may be identified, for example, using a bitmap and/or a mapping that may be used for frequency domain resource allocation.

A WTRU may determine the applicability of a candidate beam set for a resource identified by a resource index. For example, the WTRU may determine that a candidate beam set is applicable for one or more (e.g., a set of) PUCCH resources that may be identified by an index. Each of the one or more PUCCH resources may be associated with a candidate beam (e.g., as set by RRC configuration information).

A WTRU may determine the applicability of a candidate beam set for a higher layer index configuration for one or more CORESETs. For example, the WTRU may determine that a candidate beam set is applicable for one or more uplink channels (e.g., PUCCH, PUCCH, etc.) or downlink channels (e.g., PDCCH, PDSCH, etc.) if a higher layer index (e.g., a CORESETPoolId field) is configured for one or more CORESETs. The WTRU may determine that a candidate beam set is applicable for one or more CORESETs if a higher layer index (e.g., a CORESETPoolId field) is configured for all or a subset of the CORESETs and at least two different values of CORESETPoolId are configured.

A WTRU may be configured to determine a candidate beam set implicitly. The WTRU may make the determination, for example, based on a configuration of one or more CORESETs in a bandwidth part (BWP). In examples (e.g., if one or more CORESETs are configured with an index field such as a CORESETPoolId field and/or at least two different values of the index are configured or used), the WTRU may determine a candidate beam set based on one or more of following.

The WTRU may determine a candidate beam set (e.g., a number of beams in the candidate beam set) based on the number of CORESETPoolId values configured. In examples, a candidate beam set may include multiple (e.g., two) beams if one or more CORESETs are configured with multiple (e.g., two) index (e.g., CORESETPoolId) values. The WTRU may determine (e.g., select) a CORESET within CORESETs that have the same index value (e.g., CORE-SETPoolId) if one or more CORESETs are configured with the same index value. A spatial domain filter associated with the determined CORESET may be part of a candidate beam set. In examples, the WTRU may determine or use a CORESET with the lowest or highest CORESET-id within the CORESETs that have the same index value. In examples, the WTRU may determine or use a CORESET that has the highest measurement results (e.g., on a measurement resource such as a reference signal). The measurement results may include, for example, at least one of a L1-reference signal reserved power (RSRP), L3 filtered RSRP, radio link quality (e.g., a hypothetical block error rate (BLER)), or L1-signal to interference and noise ratio (SINR) based on the measurement configured for an associated reference signal (RS) and for a corresponding CORESET.

The WTRU may determine the number of beams in a candidate beam set based on the number of CORESETs that have a different beam index (e.g., a spatial domain filter, a TCI state value, etc.). In examples, a candidate beam set may include $N_b$ beams, for example, if $N_b$ CORESETs are configured and each of the CORESET is configured with a different TCI state value. In examples, a candidate beam set may include $K_b$ beams if $N_b$ CORESETs are configured and each of the CORESETs is configured with one of $K_b$ beams. The number of beams in a candidate beam set may be a function of the number of beams configured for one or more CORESETs for a BWP.

The WTRU may determine (e.g., independently) a candidate beam set for a (e.g., each) BWP. For example, the WTRU may determine and/or use one or more candidate beam sets and each of the one or more candidate beam sets may be associated with an index, which may be referred to as a candidate beam set index. The candidate beam set index may be determined, for example, based on a BWP-id.

A WTRU may be configured to modify (e.g., adapt) a candidate beam set. For example, the WTRU may modify one or more spatial filters from a candidate beam set based on MAC signaling (e.g., information included in a MAC CE). The signaling may include information identifying at least one resource for which a candidate beam set is to be modified, such as a serving cell identity, a bandwidth part identity, a type of resources (e.g., a PUCCH or PUSCH), and/or a resource index (e.g., a PUCCH resource index, a PUCCH configuration index, and/or a PUSCH configured grant index). The signaling may include information indicating which spatial filter of a candidate beam set is to be modified, such as a candidate beam index. The signaling may include a beam indication, such as an identity of spatial relation information (e.g., including power control parameters) or a TCI state index.

A WTRU may be configured to modify (e.g., update) one or more spatial filters from a candidate beam set implicitly. The WTRU may modify the one or more spatial filters from the candidate beam set based on a beam change associated with a CORESET. For example, the WTRU may modify a beam in a candidate beam set that is associated with a CORESET to a new beam configured for the CORESET (e.g., if an associated beam for a CORESET is configured for a BWP). The WTRU may modify one or more spatial filters from a candidate beam set based on a BWP-id for an active BWP in which the WTRU transmits and/or receives signals. For example, the WTRU may modify one or more spatial filters in a candidate beam set if the BWP-id is changed for an active BWP. The WTRU may modify one or more spatial filters from a candidate beam set based on a beam change associated with a PUCCH resource. The WTRU may modify one or more spatial filters from a candidate beam set based on beam reporting (e.g., a latest beam report) associated with a TRP. For example, if the WTRU reports one or more beam indexes (e.g., at slot #n-X) associated with a TRP, the one or more reported beam indexes may override, replace, or update a beam (e.g., a spatial domain filter) associated with the TRP in a candidate beam set. A WTRU may be configured to use, configure, and/or determine one or more candidate beam sets or to select a candidate beam sets from the used, configured, and/or determined candidate beam sets based on one or more scheduling parameters (e.g., a serving cell identity, a bandwidth part identity, a type of resources, and/or a resource index) and/or time resource indexes (e.g., a slot index, a subframe index, a radio frame index, a starting symbol index, and/or a symbol index).

A WTRU may be configured to select one or more beams (e.g., determine one or more spatial filters) based on a candidate beam set. The WTRU may combine multiple spatial filter selection criteria, logic, or procedures when determining the one or more spatial filters. In examples, the WTRU may select or determine a first subset of spatial filters out of a candidate beam set based on a beam group indication. The WTRU may then select or determine a spatial filter from the first subset of spatial filters, e.g., based on a priority and/or a measurement associated with the spatial filters.

A WTRU may determine that no spatial filter may be selected from a candidate beam set, e.g., after applying one or more beam selection criteria, logic, and/or procedures. For example, the WTRU may receive a beam group indication indicating that no beam group index is allowed, for example, for transmitting or receiving information using a resource. In response, the WTRU may refrain from transmitting or receiving information using the resource, or the WTRU may transmit or receive the information on the resource using a default spatial filter.

A WTRU may be configured with more than one resource, which may overlap (e.g., in the time domain). One or more (e.g., each) of the resources may be associated with respective candidate beam sets. The WTRU may apply one or more beam selection criteria, logic, and/or procedures to select a resource from the multiple configured resources. For example, the WTRU may consider a candidate beam set that may be a union of multiple (e.g., all) candidate beam sets associated with the configured resources, and may select a resource that corresponds to a spatial filter selected from the union beam set. For instance, the WTRU may be configured with multiple (e.g., two) overlapping grants and/or DL SPS assignments. A first configured grant and/or DL SPS assignment may be associated with a first candidate beam set (e.g., consisting of a first spatial filter) and a second configured grant or DL SPS assignment may be associated with a second candidate beam set (e.g., consisting of a second spatial filter). The WTRU may select the first configured grant or DL SPS assignment, for example, if beam selection criteria, logic, or procedures for the WTRU indicate that the first spatial filter (e.g., only the first spatial filter) is allowed.

A WTRU may be configured to select or determine a beam (e.g., a spatial filter) from a candidate beam set. The WTRU may be configured with a beam group indication that may be associated with a beam group index. The WTRU may receive signaling indicating whether a spatial filter of an applicable candidate beam set is allowed and/or disallowed (e.g., restricted for certain transmission or reception). The signaling may indicate, for example, an association between a beam indication and a beam group index configured for the candidate beam set. Such an association may allow a network to allow or restrict, at the same time, the use of a spatial filter by multiple WTRUs (e.g., via group signaling such as system information signaling or group-common DCI), and the signaling (e.g., of the association) may be referred to herein as a beam group indication.

The WTRU may determine the applicability of a beam group indication. For example, the WTRU may determine that a beam group indication applies to at least one candidate beam set and transmissions for which the candidate beam set is configured. The beam group indication may include at least one identifier of the at least one candidate beam set. For example, the WTRU may determine that a first candidate beam set is configured for the PUSCH (e.g., by a configured grant) and that a second candidate beam set is configured for the PUCCH. The WTRU may further determine that a beam group indication includes a field or information element (IE) indicating that the beam group indication (e.g., an association between a beam indication and a beam group index indicated by the beam group indication) is applicable to the first and/or second candidate beam sets and/or transmissions associated with the first and/or second candidate beam sets. The field may be included in DCI, for example, if the beam group indication is carried by PDCCH.

The signaling of a beam group indication may be applicable to resources that may be defined, for example, in time and/or frequency domains. In examples, a WTRU may receive an indication of one or more beam groups (e.g., identified by respective indexes) that are allowed or restricted for a set of time/frequency resources. In examples, a WTRU may receive a beam group indication that indicates whether one or more beams associated with a beam group index are allowed or restricted for a set of time/frequency resources. These resources may be defined, for example, by a time interval (e.g., a time symbol, a slot, etc.) and/or a frequency region (e.g., a set of resource blocks of a bandwidth part). For instance, these resources may include a set of time symbols (e.g., all time symbols) within one or more slots, or a set of slots (e.g., all slots) within one or more subframes.

The beam group indication described herein may be implemented, for example, as an index to a table in which each entry may indicate a set of allowed or restricted beam groups (e.g., identified by respective indexes) for a set of time/frequency resources. The beam group indication may also be implemented as a bitmap in which each bit may represent whether a beam group (e.g., identified by an index) is allowed or restricted for a time/frequency resource.

A spatial filter of a candidate beam set may be configured with more than one beam group index. A WTRU may determine that such a spatial filter is allowable if a beam group indication indicates that one or more (e.g., all) of the beam group indexes configured for the spatial filer are allowable. The WTRU may determine that the spatial filter is restricted if a beam group indication indicates that one or more (e.g., all) of the beam group indices configured for the spatial filter are restricted.

A beam group indication may be provided by signaling (e.g., by RRC signaling, a MAC CE, and/or a group-common PDCCH transmission comprising DCI). In examples, a WTRU may receive a beam group indication semi-statically via RRC signaling including, for example, via dedicated signaling or system information. In examples, a WTRU may receive a beam group indication via a group-common PDCCH transmission. In examples, a WTRU may be configured (e.g., by RRC) to monitor PDCCH candidate transmissions, e.g., based on a certain DCI format, a certain payload size, a certain aggregation level in a search space set, and/or a certain CORESET.

The DCI format described herein may include beam group indication information with or without other information (e.g., with or without a slot format indication). A cyclic redundancy check (CRC) of the DCI format may be scrambled, for example, by an RNTI such as an RNTI configured to scramble a CRC configured for this purpose. The RNTI may be, for example, a beam group RNTI (BG-RNTI). The WTRU may be configured to receive the DCI format with a periodicity (e.g., equal to or smaller than a time span of the resources to which a beam group indication applies). In examples, a beam group indication received via DCI in slot n may be applicable to slots n, n+1, . . . , n+M−1, if the time span for the beam group indication is M slots. The DCI may be configured to be decoded by a plurality of WTRUs (e.g., be decoded from a group-common PDCCH).

In examples, a beam group indication may be included in a payload of DCI scrambled with an existing group RNTI (e.g., DCI Format 2_0, 2_1, 2_2). In examples, a WTRU may interpret a slot format indication (SFI) as a beam group indication, for example, by decoding an extra bit included in DCI Format 2_0. A WTRU may interpret a payload of DCI to correspond to an SFI if the extra bit included in the DCI is 0, and may interpret a payload of DCI to correspond to a beam format indication (BFI) if the extra bit is 1.

A WTRU may monitor a PDCCH on which a beam group indication may be transmitted according to one or more of the configurations or parameters described herein. In examples, the WTRU may monitor PDCCH candidates according to multiple (e.g., two) search space configurations, where each of the search space configurations may correspond to a respective candidate beam sets and/or a respective beam group index. A beam group indication received via the PDCCH according to a search space configuration or an RNTI may (e.g., implicitly) pertain to a corresponding beam group index that may be mapped to the search space configuration or RNTI.

A WTRU may apply a beam group indication received via higher layers (e.g., RRC and/or MAC CE) to a time interval, for example, if the WTRU does not receive a beam group indication via PDCCH that is applicable to the time interval or if the WTRU receives a specific value of the beam group indication via PDCCH indicating that the WTRU is to use the beam group indication received via higher layers. A WTRU may receive a beam group indication as part of an initial access configuration. A WTRU may decode a master information block (MIB) or a system information block (SIB) with a payload field comprising a beam group indication. A WTRU may receive a BFI as part of a random access channel (RACH) procedure. For example, a WTRU may initiate a scheduling request and may decode a message received in response (e.g., msgB, msg2, or msg4) that may include a beam group indication.

A beam group indication may include a bit string. In example, each bit of the bit string may map to an SRI. The mapping may be configured to be WTRU-specific. For instance, multiple (e.g., two) WTRUs may receive the same beam group index, and each WTRU may determine an SRI based on a mapping specifically configured for the WTRU. In examples, each bit in the bit string may map to a spatial relation that may be associated with a source RS or a source physical channel (e.g., PUCCH, PDCCH, etc.), and a WTRU may select a spatial relation for transmitting the physical channel based on the mapping. In examples, each bit of the bit string may map to a time and/or frequency resource, and a WTRU may determine a spatial filter to be applied in association with the time/frequency resource based on the mapping. In examples, the bit string may map to a table, and each entry in the table (e.g., mapped to a bit in the bit string) may correspond to a sequence of spatial relations or beam group indices. A WTRU may update the spatial relations linked to a bit string, for example, by decoding a MAC-CE (e.g., a MAC-CE that may be configured for BFI updates).

A beam format indication (BFI) may be provided to prohibit or bar the use of an RS for selecting a spatial filter. A WTRU may be configured to interpret a BFI as prohibiting the use of certain spatial filters or spatial relations. For example, a BFI may comprise an extra bit in (e.g., included with) a beam group indication, and the WTRU may determine whether the beam group indication refers to allowed or prohibited spatial relations based on the BFI (e.g., based on the extra bit in the BFI). For example, the WTRU may be configured with spatial filters according to reference signals RS1 and RS2, and the RS1 spatial filter may generate interference towards a TRP. A beam group indication may, e.g., in this case, include an index of RS1 and an extra bit that indicates that the beam group indication is for barring or prohibiting a spatial relation. The WTRU may determine, based on such a beam group indication, that it may not use a spatial transmit filter associated with RS1.

The processing of a beam group indication may result in more than one allowed spatial filter. In examples, a beam group indication may indicate that a single spatial filter of a candidate beam set is allowed, and a WTRU may use the single spatial filter for an applicable resource or a portion of applicable resource. In examples, a beam group indication may indicate that more than one spatial filter of a candidate beam set is allowed, and a WTRU may select (e.g., further down-select) a spatial filter out of the allowed spatial filters, for example, based on one or more other beam selection criteria, logic, or procedures.

A WTRU may be configured to select a beam (e.g., a spatial filter) from a candidate beam set based on a priority level. For example, the WTRU may be configured with a priority level for each spatial filter of a candidate beam set, and the WTRU may select a spatial filter of the highest priority out of the candidate beam set. The priority level may be signaled via RRC signaling or a MAC CE (e.g., explicitly), or from a beam candidate index or beam group index (e.g., implicitly).

A WTRU may be configured to select a beam (e.g., a spatial filter) from a candidate beam set, for example, based on a measurement. The WTRU may be configured with a resource (e.g., a CSI-RS or an SSB) for a (e.g., each) spatial filter of a candidate beam set. The resource may be referred to as a "measurement resource" and may correspond to a source reference signal, for example, if a beam indication is based on a downlink reference signal. The measurement resource may be a resource obtained based on a CSI measurement or report configuration (e.g., received via RRC or MAC signaling) that may be associated with a spatial filter of a candidate beam set. The measurement resource may be configured and/or activated/deactivated, for example, semi-statically or based on network signaling such as a MAC CE or DCI. The DCI may be the DCI that schedules resource(s) for which a spatial filter may be selected (e.g., dynamically or semi-persistently). The measurement resource may be in a specific time instance, may be periodic, or may recur (e.g., periodically after activation).

A WTRU may be configured to perform a measurement (e.g., an L1-RSRP, a channel quality indicator (CQI), an RSRP, or a reference signal received quality (RSRQ) measurement) on the measurement resource described herein. The WTRU may select a spatial filter for which a measurement result has a maximum or minimum value. The WTRU may select a spatial filter from a subset of spatial filters for which a corresponding measurement result meets a condition. For example, the WTRU may select a spatial filter from a subset of spatial filters for which a measurement result (e.g., RSRP or CSI-RSRP) is above or below a configured threshold.

The measurement resources described herein may include a CSI-RS. The CSI-RS may be a periodic, aperiodic, or semi-persistent CSI-RS. In examples, a WTRU may be pre-configured with a set of CSI-RS resources for DL measurements and the WTRU may use one or more of the CSI-RS resources for UL beam selection. In examples, the WTRU may be configured with a set of CSI-RS resources only for the purpose of UL beam selection. In examples, the WTRU may receive an aperiodic CSI-RS along with a UL grant allocation that triggers a UL beam selection. For instance, a DCI scheduling a UL grant may trigger measurements of one or more CSI-RS's and may trigger a CSI report (e.g., prior to an uplink transmission) to a network (e.g., a gNB). The network node (e.g., the gNB) may determine from the reported CSI which one or more UL beams may be used by the WTRU for uplink transmissions.

The measurement resources described herein may include an SSB (e.g., a primary synchronization signal (PSS), a secondary synchronization signal (SSS), and/or a demodulation reference signal (DM-RS) of a physical broadcasting channel (PBCH)). In examples, a WTRU may use a PSS and/or SSS to select UL beams for UL transmission. In examples, a WTRU may use a DM-RS associated with a PBCH transmission to select UL beams for UL transmission.

The measurement resources described herein may include a DM-RS associated with a PDSCH transmission. For example, a WTRU may select one or more UL beams based on a measurement performed on a DM-RS (e.g., a DM-RS of a PDSCH), for example, after a pre-configured time window (e.g., for planned UL transmissions after X ms of a PDSCH reception).

The measurement resources described herein may include a phase tracking reference signal (PT-RS) of a PDSCH transmission. For example, a WTRU may use a PT-RS associated with a PDSCH transmission to select the set of UL beams. The selection may be based on measurements performed on the PT-RS and/or may be performed after a pre-configured time window (e.g., for planned UL transmissions after X ms of a PDSCH reception).

A WTRU may be configured to associate downlink reference signals (DL RS) with uplink beams and/or SRI states and use the association to select a UL beam and/or SRI for uplink transmissions. For example, the WTRU may (e.g., for each DL RS) attempt different uplink beams to receive a DL RS and may select the best N (e.g., one or more) uplink beams that maximize a received energy of the DL RS. The WTRU may establish the association, for example, after measuring a DL RS for a pre-configured time duration. In examples, the WTRU may establish the association (e.g., on the WTRU side), for example, without reporting the association to the network (e.g., a gNB). In examples, the WTRU may report the association to the network, for example, using a PUCCH and/or PUSCH transmission.

A WTRU may be configured to select one or more UL beams for uplink transmission based on the detected energy of one or more DL reference signals. In examples, the WTRU may be configured to exclude or forbid one or more UL beams, for example, if one or more corresponding DL reference signals are detected with energy below a configured threshold. In examples, the WTRU may be configured to select (e.g., pre-select) one or more UL beams if one or more corresponding DL reference signals are detected with energy above a configured threshold. The threshold may be configured, for example, semi-statically, or statically (e.g., fixed in a specification). The configured threshold may be adjusted (e.g., dynamically), for example, using dynamic signaling (e.g., explicitly or implicitly) from a gNB or may be adjusted by a WTRU, for example, based on characteristics of an intended uplink transmission. In examples (e.g., for high reliability transmission), the WTRU may be configured to apply a high energy detection (ED) threshold of a DL reference signal, for example, to select (e.g., pre-select) one or more corresponding UL beams for transmission. In examples (e.g., for a relatively low reliability requirement), the WTRU may be configured to apply a low ED threshold for UL beam selection. In examples, the WTRU may select uplink beams using a weighted average of energy received for a DL RS over multiple slots. The weight coefficient(s) used to determine the average may be configured for the WTRU (e.g., v) or may be fixed in WTRU implementation (e.g., based on a specification).

A WTRU may be configured to measure one or more source RS (e.g., DL RS such as CSI-RS and/or SSB) and may determine a spatial receive filter based on the measurement (e.g., for each source RS). A WTRU may be configured to determine (e.g., use) a spatial receive filter based on a spatial transmission filter that the WTRU uses for a source RS such as an SRS (e.g., considering reciprocity). A WTRU may determine (e.g., use) a spatial transmission filter to be applied to a target RS (e.g., UL SRS and/or DM-RS) based on a spatial receive filter that the WTRU uses for a DL RS. The WTRU may send a PUSCH transmission over multiple slots and/or over multiple symbols within a slot.

A DCI may indicate a pattern for a source RS. In examples, a WTRU may be configured to determine a spatial relation of a target RS over several repetitions based on a pattern indication in a DCI (e.g., contained in a PDCCH transmission), for example, if a PUSCH is scheduled by the DCI. The pattern indication may include a pattern of a source RS linked to a slot or subframe. Multiple patterns may be configured (e.g., preconfigured) for the WTRU, and the indication (e.g., in the DCI) may include an index (e.g., a bit string) to a pattern among the multiple configured patterns. The WTRU may determine a spatial relation for a slot or subframe according to a selected (e.g., a best) spatial transmission filter matching the source RS. The spatial transmission filter (e.g., the best spatial transmission filter) may be selected, for example, during the WTRU's initial access to the network and/or based on CSI measurements.

A WTRU may be configured to select a spatial transmission filter based on, for example, a (e.g., one) source RS linked to multiple target RS. The multiple target RS (e.g., a pool of target reference signals) may be linked to a source RS pattern or a source RS. The WTRU may determine a spatial transmission filter for each of a sequence of slots and/or subframes based on one or more (e.g., any combination of) reference signals from the target RS pool that is linked to the source RS pattern or source RS.

Figure 3:
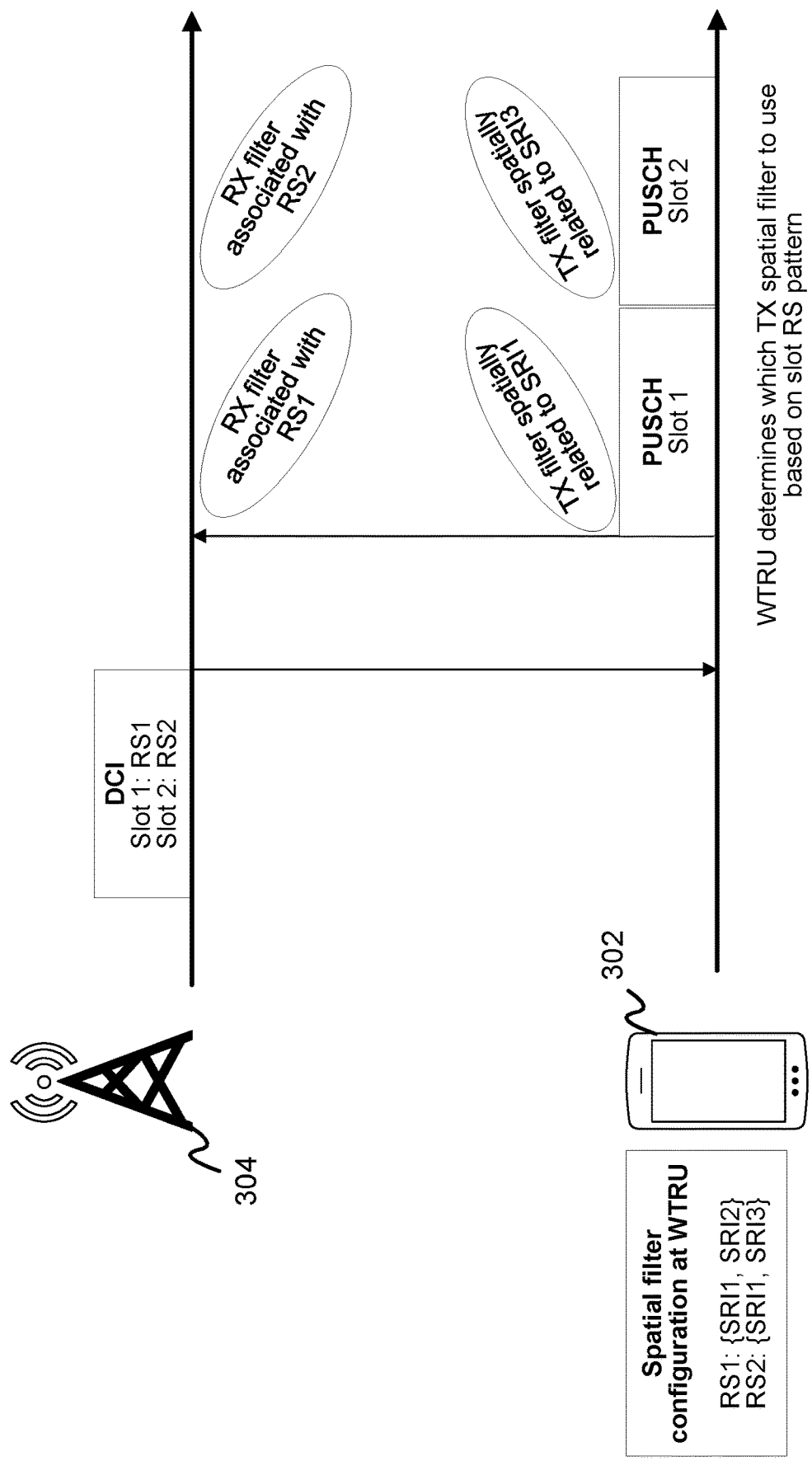
FIG. 3 is a diagram illustrating an example of determining a spatial transmission filter.

FIG. 3 illustrates an example of determining a spatial transmission filter. As shown, a WTRU 302 may determine a spatial transmission filter on its own or with assistance from a TRP 304. The WTRU 302 may determine a spatial configuration associating a source reference signal RS1 with target reference signals SRI1 and SRI2, and associating a source reference signal RS2 with target reference signals SRI1 and SRI3. An activated source reference signal sequence or pattern may be (e.g., dynamically) indicated, for example, in a DCI received by the WTRU 302, or in a time domain configuration for the WTRU (e.g., for one or more slots or subframes). Such a source reference signal sequence (e.g., a slot RS pattern) may, for example, map RS1 to a first time period (e.g., slot 1) and RS2 to a second time period (e.g., slot 2). The WTRU 302 may receive the source reference signal sequence and determine that the first time period (e.g., slot 1) is associated with RS1 and the second time period (e.g., slot 2) is associated with RS2. The WTRU may select a spatial filter to be associated with SRI1 or SRI2 (e.g., based on the association between RS1 and SRI1/SRI2), and may perform a PUSCH transmission in the first time period using the spatial filter. On the network side, the TRP 304 may set a spatial receive filter according to RS1 (e.g., since RS1 is associated with SRI1 and/or SRI2). In the second time period (e.g., slot 2), the WTRU may determine that the spatial filter associated with SRI1 is no longer suitable (e.g., due to blockage and/or rotation), and may select a spatial filter associated with SRI3 (e.g., based on the association between RS2 and SRI1/SRI3) for transmission in the second time period.

A source RS sequence may be linked to a sequence of time periods (e.g., slots). Each time period (e.g., each slot) may include multiple PUSCH repetitions. A target RS from a target RS pool may be linked, for example, to the multiple repetitions in the time period and repetitions in the next time period may be linked to a different target RS from the same pool. The pool may be associated with a source RS. For example, a PUSCH transmission may be performed with four (4) repetitions. Repetitions 1 and 2 may be sent in time period one (e.g., slot one) and repetitions 3 and 4 may be sent in time period two (e.g., slot two). A target RS pool may include two target reference signals (e.g., target RS1 and target RS2) associated with one source reference signal. A WTRU may be configured to use target RS1 during time period one (e.g., slot one) that is associated with repetitions 1 and 2, and use target RS2 during time period 2 (e.g., slot 2) that is associated with repetitions 3 and 4. A TRP may use the one source RS linked to the target RS pool during time periods one and two (e.g., slots 1 and 2) to establish its spatial receive filter since target RS1 and target RS2 belong to the same target RS pool.

A WTRU may be configured to select a beam (e.g., a spatial filter) from a candidate beam set for multiple time periods or intervals based on one or more dependencies between the time periods or intervals (e.g., based on a timer, a HARQ process, etc.). For example, the WTRU may select a spatial filter or a resource for a first time interval, and may select the same spatial filter and/or resource (e.g., used in the first time interval) for a second time interval. The selection of the same spatial filter and/or resource may occur, for example, under one or more of the following conditions: a timer (e.g., a configured grant timer) started in the first time interval is still running (e.g., has not expired) in the second time period (e.g., the value of the timer may be configured by higher layers); and/or the first and second time intervals correspond to transmissions for the same HARQ process and/or for the same MAC PDU.

A WTRU may be configured with multiple configured grants, and each of the configured grants may be associated with at least one set of beams. The WTRU may determine (e.g., dynamically) whether it may use a configured grant (e.g., to perform one or more transmissions of a TB). The WTRU may determine whether to use one or multiple resources of a configured grant (e.g., at a given time) based on the status of a timer, which may allow a gNB to schedule a resource of another configured grant for another WTRU. The WTRU may be configured with a timer that is associated with a configured grant. The timer may be started or restarted if (e.g., when) the WTRU uses one or multiple resources of the configured grant for transmission and/or retransmission of a TB. The WTRU may not be allowed to use another configured grant if the timer is running.

A WTRU may be configured with a timer that is associated with a set of beams (e.g., spatial filters). The WTRU may start or restart the timer if (e.g., when) the WTRU uses a beam from the set of beams for transmission and/or reception. The WTRU may not be allowed to use a configured grant that may be associated with a different beam and/or set of beams if the timer is running.

A WTRU may be configured to use multiple (e.g., two or more) configured grants for transmission of a TB. The WTRU may determine whether to use the two or more configured grants for transmission of the TB based on one or more (e.g., any combination) of the following: a time gap between resources (e.g., two resources) of the multiple (e.g., two) configured grants; a number of repetitions in a bundle of a first configured grant; a property of the data included in the TB; and/or one or more properties of the configured grants. In examples, the WTRU may determine whether to use a second configured grant to perform a retransmission of a TB (e.g., where an initial transmission of the TB is performed in a first configured grant) based on a time gap between the first and second configured grants. In examples, the time gap between the configured grants may be calculated as a time gap between two initial transmissions resources in the configured grants. In examples, the time gap between the configured grants may be determined as a time gap between a last transmission in a bundle of the first configured grant and an initial transmission resource in the second configured grant. The WTRU may perform a retransmission of the TB in the second configured grant if the time gap between the two configured grants is smaller than a first threshold and/or greater than a second threshold.

Figure 4:
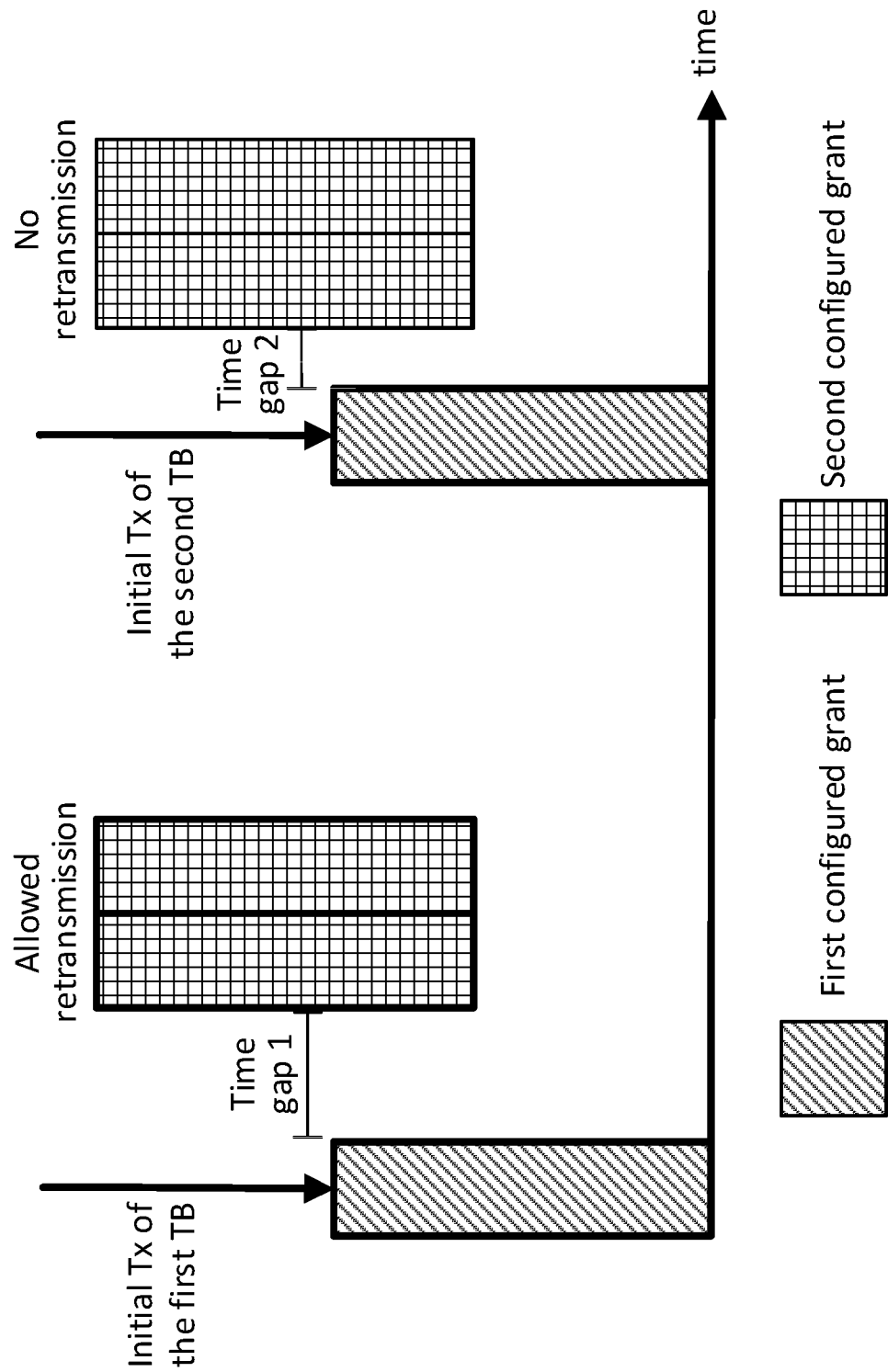
FIG. 4 is a diagram illustrating an example of determining whether to use a configured grant to perform a retransmission of a transport block (TB).

FIG. 4 is a diagram illustrating an example of determining whether to use a second configured grant to perform a retransmission of a TB. As shown, a WTRU may be scheduled with two configured grants (e.g., a first configured grant and a second configured grant). For a first TB, a time gap between the two configured grants (e.g., time gap 1) may be greater than a first threshold, so the WTRU may be configured to perform a retransmission of the TB in the second configured grant based on the time gap being greater than the first threshold. For a second TB, a time gap between the two configured grants (e.g., time gap 2) may be smaller than a second threshold, so the WTRU may be configured to not perform a retransmission in the second configured grant based on the time gap being smaller than the second threshold. The first and second thresholds may have the same value or may have different values.

A WTRU may determine whether to use a second configured grant to perform a retransmission of a TB, e.g., after the WTRU has performed an initial transmission in a first configured grant, based on the number of transmission resources associated with a bundle of the first configured grant. The WTRU may perform the retransmission in the second configured grant, for example, if the number of transmission resources is smaller than a threshold. The WTRU may decide to not perform the retransmission of the TB in the second configured grant, for example, if the number of transmission resources is equal to or greater than the threshold.

A WTRU may be configured to indicate a set of beams (e.g., spatial filters) for PUSCH transmission to a network. The WTRU may be configured, for example, to (e.g., autonomously) select a set of beams for downlink or uplink transmission and indicate the selected beams to a gNB. For example, the WTRU may be configured with PUSCH repetition over multiple timer periods (e.g., different slot/mini slots), and the WTRU may select a different beam for each repetition occasion, for example, to increase the reliability of the uplink transmission and/or the coverage of the network. The WTRU may select the beams from a pre-configured set of beams. The WTRU may receive the pre-configured set of beams, for example, after establishing an RRC connection with the network or via one or more broadcasted messages (e.g., one or more SIBs). The WTRU may use one or more (e.g., a combination) of the following to indicate the selected beam(s) to the network.

The WTRU may indicate the selected beam(s) using uplink control information (UCI) (e.g., having a certain UCI format). The UCI may be carried, for example, using a configured resource from a gNB with one or more pre-defined transmission parameters (e.g., PRB allocations, time domain allocations, sequence configurations, and/or spatial parameters configurations). For example, the WTRU may be configured (e.g., via a pre-defined spatial configuration) to perform a PUCCH transmission (e.g., UCI) to indicate a beam selection to the network. The WTRU may, upon selecting a set of UL beams and/or prior to performing a PUSCH transmission using the UL beams, use the configured PUCCH to indicate the selected UL beams to the network. The PUCCH transmission (e.g., UCI) that indicates the selected beam(s) may be multiplexed with other PUCCH transmissions (e.g., other UCIs), such as a HARQ-ACK feedback, a scheduling request (SR) or a CSI report. The PUCCH transmission (e.g., UCI) that indicates the selected beam(s) may be piggybacked with a PUSCH transmission.

The WTRU may indicate the selected beam(s) using an SRS resource. For example, the WTRU may be configured with multiple SRS resources that may be mapped to a set of uplink beams, and the WTRU may transmit an SRS corresponding to the selected beam(s), e.g., prior to performing an uplink transmission using the selected beam(s). The WTRU may be preconfigured (e.g., via an SRS resource configuration) with a set of SRS resources, e.g., prior to an uplink transmission. The SRS resource configuration may include, for example, one or more of a sequence ID, spatial relation information, or a number of SRS ports.

The WTRU may indicate the selected beam(s) using a UL transmission (e.g., a PUSCH transmission) performed with a configured grant. For example, the WTRU may be configured with a configured grant (CG) to perform an autonomous uplink transmission (e.g., such a transmission may be referred to herein as a CG-PUSCH transmission), and the WTRU may use the transmission (e.g., the CG-PUSCH transmission) to indicate one or more selected beams that are to be used for subsequent transmissions (e.g., including those performed using dynamic UL grants). The WTRU may use a MAC CE to indicate the selected UL beam(s).

The WTRU may indicate the selected beam(s) using a UL transmission performed with a dynamic grant transmission. For example, the WTRU may use the first transmission opportunity to indicate the selected UL beam(s) for subsequent transmission(s).

The WTRU may indicate the selected beam(s) using one or more indexes. The WTRU may be configured with a set of DL reference signals (e.g., via a table), each of which may be associated with an (e.g., a specific) index. The set of DL reference signals may include, for example, one or more SSBs, one or more CSI-RS's, and/or one or more DM-RS's. The WTRU may associate a DL reference signal with one or more DL and/or UL beams. In examples, the WTRU may indicate to a gNB the DL reference signal indexes that corresponding to the DL or UL beams. In examples, the WTRU may report a UL beam index to a gNB if the WTRU has reported an association between DL reference signals and UL beams.

Figure 5:
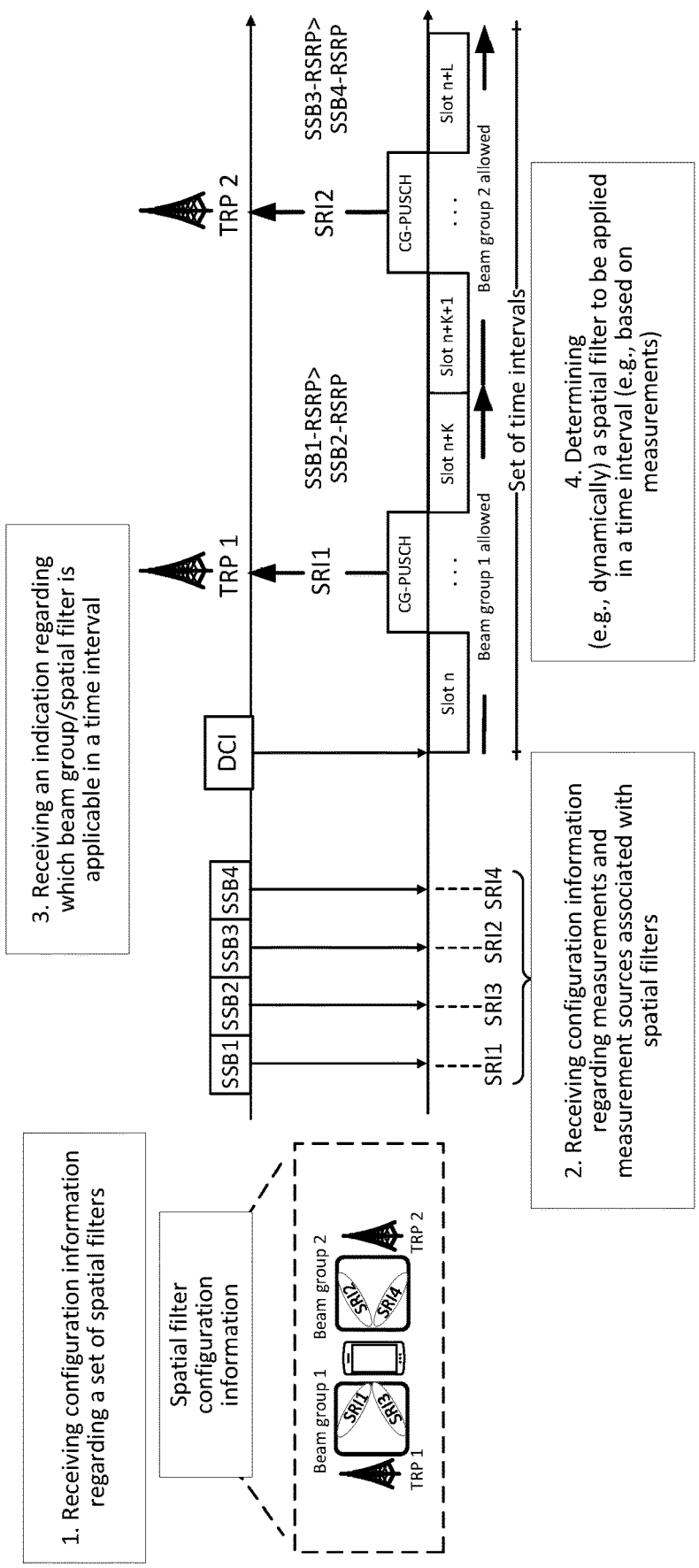
FIG. 5 is a diagram illustrating an example of determining a spatial filter based on network indications.

FIG. 5 is a diagram illustrating an example of determining (e.g., dynamically) a spatial filter based on network indications (e.g., DCI indications). At 1, a WTRU may receive configuration information from a network regarding a plurality of spatial filters (e.g., beams). The configuration information may indicate, for example, a resource (e.g., a PUSCH resource, which may be scheduled by a configured grant) for which the spatial filters may be applicable. The configuration information may indicate, for example, a beam group (e.g., a beam group index) with which each of the configured spatial filters may be associated (e.g., the configured spatial filters may be organized into one or more beam groups or spatial filter groups). Such a beam group may be associated, for example, with a TRP (e.g., beam group1 for TRP 1, beam group 2 for TRP 2, etc.).

At 2, the WTRU may also receive measurement configuration information from the network. The measurement configuration information may indicate, for example, a measurement resource (e.g., a reference signal such as an SSB) associated with each of the spatial filters configured for the WTRU, and/or a type of measurements (e.g., RSRP) to be performed on the measurement resource. Based on the measurement configuration information, the WTRU may perform a measurement on the measure resource.

At 3, the WTRU may receive an indication from the network regarding which one or more beam groups are allowed for a given time period or time interval (e.g., a set of time periods or time intervals). The indication may be included, for example, in DCI received by the WTRU and the time periods indicated therein may include a set of slots, a set of subframes, a set of symbols, etc. The DCI may be common to a group of WTRUs, for example, to reduce signaling overhead.

At 4, the WTRU may determine, based on the indication received from the network, a spatial filter to be applied in a time period or time interval. For example, the WTRU may determine, based on the indication received from the network, one or more beam groups (e.g., beam group indices) that are valid for the time period, and further determine, based on an association between the beam groups (e.g., beam group indices) and corresponding spatial filters, one or more spatial filters that are applicable to the time period (e.g., to a CG-PUSCH transmission). In examples (e.g., when there are multiple applicable spatial filters for the time period), the WTRU may select a spatial filter further based on a measurement (e.g., an SSB measurement) performed in association with the spatial filter. The measurement may be performed, for example, based on the measurement configuration information described herein. Responsive to selecting the spatial filter, the WTRU may perform one or more communication tasks (e.g., one or more CG-PUSCH transmissions) using the selected spatial filter.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

The invention claimed is:

1. A wireless transmit receive unit (WTRU), comprising:
 a processor configured to:
  receive configuration information from a network device, wherein the configuration information indicates an association between a set of spatial filters and a beam group;
  receive downlink control information (DCI), wherein the DCI includes a beam group indication and indicates at least one time period to which the beam group indication is applicable;
  select, based on at least the association indicated by the configuration information and the beam group indication included in the DCI, a spatial filter from the set of spatial filters to apply in the at least one time period; and
  perform a transmission or reception in the at least one time period using the selected spatial filter.

2. The WTRU of claim 1, wherein the processor is configured to select the spatial filter from the set of spatial filters further based on a measurement performed using a measurement resource associated with the spatial filter.

3. The WTRU of claim 1, wherein the DCI is group-common DCI associated with a group of WTRUs.

4. The WTRU of claim 1, wherein the configuration information associates the set of spatial filters with an identifier of the beam group, and wherein the beam group indication includes the identifier of the beam group.

5. The WTRU of claim 1, wherein the processor is further configured to determine, based on the spatial filter selected for the at least one time period, a frequency resource to be used to perform the transmission or reception in the at least one time period.

6. The WTRU of claim 1, wherein the at least one time period comprises a symbol, a time slot, or a subframe.

7. The WTRU of claim 1, wherein the transmission performed using the selected spatial filter includes an uplink transmission scheduled by a configured grant.

8. The WTRU of claim 1, wherein the set of spatial filters are associated with respective beams.

9. The WTRU of claim 1, wherein the processor is configured to communicate with multiple transmission/reception points (TRPs), and wherein the beam group is associated with one of the multiple TRPs.

10. The WTRU of claim 1, wherein the processor is further configured to transmit an indication of the selected spatial filter to the network device.

11. The WTRU of claim 10 wherein the indication is transmitted via uplink control information (UCI) or a media access control (MAC) control element (MAC CE).

12. A method implemented by a wireless transmit receive unit (WTRU), the method comprising:
- receiving configuration information from a network device, wherein the configuration information indicates an association between a set of spatial filters and a beam group;
- receiving downlink control information (DCI), wherein the DCI includes a beam group indication and indicates at least one time period to which the beam group indication is applicable;
- selecting, based on at least the association indicated by the configuration information and the beam group indication included in the DCI, a spatial filter from the set of spatial filters to apply in the at least one time period; and
- performing a transmission or reception in the at least one time period using the selected spatial filter.

13. The method of claim 12, wherein the spatial filter is selected from the set of spatial filters further based on a measurement performed using a measurement resource associated with the spatial filter.

14. The method of claim 12, wherein the configuration information associates the set of spatial filters with an identifier of the beam group, the DCI is group-common DCI associated with a group of WTRUs, and the beam group indication includes the identifier of the beam group.

15. The method of claim 12, further comprising determining, based on the spatial filter selected for the at least one time period, a frequency resource to be used to perform the transmission or reception in the at least one time period.

16. The method of claim 12, wherein the at least one time period comprises a symbol, a time slot, or a subframe.

17. The method of claim 12, wherein the transmission performed using the selected spatial filter includes an uplink transmission scheduled by a configured grant.

18. The method of claim 12, wherein the set of spatial filters is associated with respective beams.

19. The method of claim 12, wherein the WTRU is configured to communicate with multiple transmission/reception points (TRPs), and wherein the beam group is associated with one of the multiple TRPs.

20. The method of claim 12, further comprising transmitting an indication of the selected spatial filter to the network device via uplink control information (UCI) or a media access control (MAC) control element (MAC CE).

* * * * *